(12) United States Patent
Takahara et al.

(10) Patent No.: US 8,148,448 B2
(45) Date of Patent: Apr. 3, 2012

(54) TIRE PUNCTURE SEALANT

(75) Inventors: Hideyuki Takahara, Hiratsuka (JP);
Takahiro Okamatsu, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 0 days.

(21) Appl. No.: 12/819,733

(22) Filed: Jun. 21, 2010

(65) Prior Publication Data
US 2011/0144237 A1 Jun. 16, 2011

(30) Foreign Application Priority Data

Jun. 22, 2009 (JP) ................................ 2009-147871
Sep. 16, 2009 (JP) ................................ 2009-214287

(51) Int. Cl.
*B29C 73/10* (2006.01)
(52) U.S. Cl. .................... 523/166; 524/502; 524/524
(58) Field of Classification Search .................. 523/166; 524/502, 524
See application file for complete search history.

(56) References Cited

U.S. PATENT DOCUMENTS

| | | | | | |
|---|---|---|---|---|---|
| 4,806,590 | A | * | 2/1989 | Padget et al. ................. | 524/568 |
| 5,739,196 | A | * | 4/1998 | Jenkins et al. ................ | 524/460 |
| 6,329,447 | B1 | * | 12/2001 | Avramidis et al. ............ | 523/201 |
| 6,889,723 | B2 | | 5/2005 | Gerresheim et al. | |
| 6,992,119 | B2 | | 1/2006 | Kojima et al. | |
| 2007/0203260 | A1 | | 8/2007 | Okamatsu | |
| 2011/0003920 | A1 | * | 1/2011 | Matsuda et al. .............. | 524/156 |

FOREIGN PATENT DOCUMENTS

| | | |
|---|---|---|
| JP | 9118779 | 5/1997 |
| JP | 2004035867 | 2/2004 |
| JP | 2005-120272 | 5/2005 |
| JP | 2007-224246 | 9/2007 |
| JP | 2007-224248 | 9/2007 |
| WO | WO 2006038403 A1 * | 4/2006 |

OTHER PUBLICATIONS

WO2006038403A1, Apr. 2006, Derwent Ab.*

* cited by examiner

*Primary Examiner* — Satya Sastri
(74) *Attorney, Agent, or Firm* — Thorpe North & Western LLP (57) ABSTRACT

A tire puncture sealant having both excellent sealing performance and excellent storage performance, specifically a tire puncture sealant containing a natural rubber latex (A) and a VEVA copolymer resin emulsion (B), wherein the solid content mass of the natural rubber latex (A)/solid content mass of the VEVA copolymer resin emulsion (B) is between 80/20 and 15/85.

20 Claims, 5 Drawing Sheets

Table 1

| | | | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | | | | | | | | Examples | | | | | | | |
| Main components | NR latex | | 50 (30) | 83 (50) | 113 (80) | 83 (50) | 83 (50) | 83 (50) | 83 (50) | 83 (50) | 83 (50) | 83 (50) | 83 (50) | 83 (50) | 83 (50) |
| | VEVA emulsion | | 135 (70) | 96 (50) | 38 (20) | 96 (50) | 96 (50) | 96 (50) | 96 (50) | 96 (50) | 96 (50) | 96 (50) | 96 (50) | 96 (50) | 96 (50) |
| | EVA emulsion | | | | | | | | | | | | | | |
| Tackifier | | | | | | | | | | | | | | | |
| Antifreezing agent | Propylene glycol | | 110 | 110 | 110 | | | 110 | 110 | 140 | 180 | | | | |
| | Ethylene glycol | | | | | 110 | | | | | | | | | |
| | Di(ethylene glycol) | | | | | | 110 | | | | | | | | |
| Surfactants | Nonionic | POE alkyl ether (1) | 0.30 | 0.50 | 0.68 | 0.50 | 0.50 | 0.25 | 1.00 | 0.50 | 0.50 | 0.50 | 0.50 | | 0.50 |
| | | POE alkyl ether (2) | | | | | | | | | | | | | |
| | | POE alkyl ether (3) | | | | | | | | | | | | | |
| | | POE phenyl ether | | | | | | | | | | | | | |
| | | POE alkylamine | | | | | | | | | | | | | |
| | Anionic | SDS | 0.30 | 0.50 | 0.68 | 0.50 | 0.50 | 0.25 | 1.00 | 0.50 | 0.50 | 0.50 | 0.50 | | 0.50 |
| | Nonionic/anionic | | 1.0/1.0 | 1.0/1.0 | 1.0/1.0 | 1.0/1.0 | 1.0/1.0 | 1.0/1.0 | 1.0/1.0 | 1.0/1.0 | 1.0/1.0 | 1.0/1.0 | 1.0/1.0 | - | 1.0/1.0 |
| | Added content (mass%) | | 2.0 | 2.0 | 2.0 | 2.0 | 2.0 | 1.0 | 4.0 | 2.0 | 2.0 | 2.0 | 2.0 | - | 2.0 |
| Viscosity modifier | | | 7 | 7 | 7 | 7 | 7 | 7 | 7 | 7 | 7 | 7 | 7 | 60 | 60 |
| Physical properties | Solid content (mass%) | | 33.311 | 33.912 | 33.011 | 33.912 | 33.912 | 33.633 | 33.463 | 30.801 | 27.444 | 36.738 | 41.109 | 41.841 | 41.841 |
| | Viscosity (20°C, mPa·s) | | 58 | 52.5 | 48 | 50 | 52.5 | 50 | 50 | 46 | 42 | 110 | 150 | 50 | 50 |
| Sealing performance | Center groove portion | | ○ | ○ | ○ | ○ | ○ | ⊙ | ○ | ○ | ○ | ○ | × | ○ | ○ |
| | Shoulder groove portion | | ○ | ⊙ | ○ | ○ | ○ | ⊙ | ○ | ○ | ○ | ○ | ○ | ○ | ○ |
| Storage stability | | | ○ | ○ | ○ | ○ | ○ | ○ | ○ | ○ | ○ | ○ | ○ | ○ | ○ |
| Viscosity stability performance | | | ○ | ○ | ○ | ○ | ○ | ○ | ○ | ○ | ○ | ○ | ○ | ○ | ○ |

FIG. 1a

Table 1 (continued)

| | | | 14 | 15 | 16 | 17 | 18 | 19 | 20 | 21 | 22 | 23 | 24 | 25 |
|---|---|---|---|---|---|---|---|---|---|---|---|---|---|---|
| Main components | NR latex | | 83 (50) | 83 (50) | 83 (50) | 83 (50) | 83 (50) | 83 (50) | 83 (50) | 83 (50) | 83 (50) | 33 (20) | 33 (20) | 25 (15) |
| | VEVA emulsion | | 96 (50) | 96 (50) | 96 (50) | 96 (50) | 96 (50) | 96 (50) | 96 (50) | 96 (50) | 96 (50) | 154 (80) | 154 (80) | 163 (85) |
| | EVA emulsion | | | | | | | | | | | | | |
| Tackifier | | | | | | | | | | | | | | |
| Antifreezing agent | Propylene glycol | | 110 | 110 | 110 | 110 | 110 | 110 | 110 | 110 | 110 | 110 | 180 | 110 |
| | Ethylene glycol | | | | | | | | | | | | | |
| | Di(ethylene glycol) | | | | | | | | | | | | | |
| Surfactants | Nonionic | POE alkyl ether (1) | 0.33 | 1.00 | 1.49 | 0.50 | 0.50 | | | | | 0.20 | 0.20 | 0.15 |
| | | POE alkyl ether (2) | | | | | | 1.00 | | | | | | |
| | | POE alkyl ether (3) | | | | | | | 1.00 | | | | | |
| | | POE phenyl ether | | | | | | | | 1.00 | | | | |
| | | POE alkylamine | | | | | | | | | 1.00 | | | |
| | Anionic | SDS | 0.67 | 1.00 | 1.00 | 1.00 | 2.00 | 1.00 | 1.00 | 1.00 | 1.00 | 0.20 | 0.20 | 0.15 |
| | Nonionic/anionic | | 1.0/2.0 | 1.0/1.0 | 1.5/1.0 | 1.0/2.0 | 1.0/4.0 | 1.0/1.0 | 1.0/1.0 | 1.0/1.0 | 1.0/1.0 | 1.0/1.0 | 1.0/1.0 | 1.0/1.0 |
| | Added content (mass%) | | 2.0 | 4.0 | 5.0 | 3.0 | 5.0 | 4.0 | 4.0 | 4.0 | 4.0 | 2.0 | 2.0 | 2.0 |
| Viscosity modifier | | | 7 | 7 | 7 | 7 | 7 | 7 | 7 | 7 | 7 | 7 | 100 | 7 |
| Physical properties | Solid content (mass%) | | 34.1 | 34.5 | 34.9 | 34.4 | 34.9 | 34.5 | 34.5 | 34.5 | 34.5 | 32.9 | 21.5 | 32.8 |
| | Viscosity (20°C, mPa·s) | | 50 | 50 | 52.5 | 50 | 52.5 | 50 | 50 | 50 | 50 | 52 | 35 | 55 |
| Sealing performance | Center groove portion | | ○ | ○ | ○ | ○ | ○ | ○ | ○ | ○ | ○ | ○ | ○ | ○ |
| | Shoulder groove portion | | ◉ | ○ | ○ | ○ | ○ | ○ | ○ | ○ | ○ | ○ | ○ | ○ |
| Storage performance | Storage stability | | ○ | ○ | ○ | ○ | ○ | ○ | ○ | ○ | ○ | ○ | ○ | ○ |
| | Viscosity stability | | ○ | ○ | ○ | ○ | ○ | ○ | ○ | ○ | ○ | ○ | ○ | ○ |

Examples

FIG. 1b

Table 2

| | | | Comparative examples | | | | | | |
|---|---|---|---|---|---|---|---|---|---|
| | | | 1 | 2 | 3 | 4 | 5 | 6 | 7 |
| Main components | NR latex | | 166 (100) | 150 (90) | 17 (10) | | | 83 (50) | 83 (50) |
| | VEVA emulsion | | | 19 (10) | 174 (90) | 200 (100) | | | |
| | EVA emulsion | | | | | | 166 (100) | 96 (50) | 96 (50) |
| Tackifier | | | | | | | | 10 | |
| Antifreezing agent | Propylene glycol | | 110 | 110 | 110 | 110 | 110 | 110 | 110 |
| | Ethylene glycol | | | | | | | | |
| | Di(ethylene glycol) | | | | | | | | |
| Surfactants | Nonionic | POE alkyl ether (1) | 1.00 | 0.90 | 0.10 | | 0.60 | 0.50 | 0.50 |
| | | POE alkyl ether (2) | | | | | | | |
| | | POE alkyl ether (3) | | | | | | | |
| | | POE phenyl ether | | | | | | | |
| | | POE alkylamine | | | | | | | |
| | Anionic | SDS | 1.00 | 0.90 | 0.10 | | 0.60 | 0.50 | 0.50 |
| | Nonionic/anionic | | 1.0/1.0 | 1.0/1.0 | 1.0/1.0 | | 1.0/1.0 | 1.0/1.0 | 1.0/1.0 |
| | Added content (mass%) | | 2.0 | 2.0 | 2.0 | | 2.0 | 2.0 | 2.0 |
| Viscosity modifier | | | 7 | 7 | 7 | 7 | 7 | 7 | 7 |
| Physical properties | Solid content (mass%) | | 35.6 | 35.3 | 32.7 | 32.8 | 35.5 | 32.8 | 33.9 |
| | Viscosity (20°C, mPa·s) | | 50 | 45 | 58 | 60 | 65 | 55 | 56 |
| Sealing performance | Center groove portion | | ○ | ○ | × | × | ○ | ○ | ○ |
| | Shoulder groove portion | | ◉ | ◉ | ○ | ○ | ◉ | ◉ | ○ |
| Storage performance | Storage stability | | × | ○ | ○ | ○ | ○ | ○ | × |
| | Viscosity stability | | × | × | ○ | ○ | × | × | × |

FIG. 2

Table 3

|  | Manufacturing examples | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| NR latex | 100 | 100 | 100 | 100 | 100 | 100 | 100 | 150 | 150 | 50 | 50 | 150 | 50 |
| EVA emulsion 1 | 100 | 100 | 100 | 100 | 100 | 100 | 100 | 100 | 100 |  |  |  |  |
| EVA emulsion 2 |  |  |  |  |  |  |  |  |  | 100 | 100 |  |  |
| EVA emulsion 3 |  |  |  |  |  |  |  |  |  |  |  | 100 | 100 |
| Surfactant 1 | 0.5 | 0.6 | 0.7 | 1 | 0.5 | 0.5 | 0.5 | 0.2 | 0.2 | 0.3 | 0.3 | 1.5 | 0.3 |
| Surfactant 2 | 1 | 0.7 | 0.5 | 1 | 1 | 1 | 1 | 0.2 | 0.3 | 0.4 | 0.4 | 1.5 | 0.4 |
| Antifreezing agent 1 | 250 |  |  | 250 | 50 |  |  | 650 | 650 |  |  | 650 | 650 |
| Antifreezing agent 2 |  | 100 |  |  |  | 50 |  |  |  | 700 |  |  |  |
| Antifreezing agent 3 |  |  | 100 |  |  |  | 50 |  |  |  | 700 |  |  |
| Increase in temperature (°C) | 5 | 7 | 7 | 8 | 2 | 2 | 2 | 12 | 15 | 15 | 15 | 14 | 13 |
| Amount of gel produced (mass%) | <0.5 | <0.5 | <0.5 | <0.5 | <0.5 | <0.5 | <0.5 | 3.5 | 6.7 | 3.9 | 4 | 2.9 | 3.5 |
| Amount of gel produced (evaluation) | A | A | A | A | A | A | A | E | E | E | E | D | E |

TIRE PUNCTURE SEALANT

PRIORITY CLAIM

This application is based upon and claims the benefit of priority from Japanese Patent Application Nos. 2009-147871 and 2009-214287, filed Jun. 22, 2009, the entire contents of both of which is incorporated herein by reference.

BACKGROUND

1. Technical Field

The present invention relates to a tire puncture sealant.

2. Related Art

Automobile manufacturers are more frequently providing puncture repair kits as standard or optional equipment. Such puncture repair kits contain a tire puncture sealant as an essential constituent and can also include a compressor as an optional constituent. Actual products are generally compact packages that combine the tire puncture sealant, known as an "emergency tire puncture repairing agent" or the like, and a low capacity compressor that draws power via a cigarette lighter socket.

Conventionally, products containing a rubber latex and/or a resin emulsion, an antifreezing agent and a tackifier have been widely used as the tire puncture sealant.

Japanese Patent No. 3210863 describes "a puncture sealant for sealing a punctured tire, containing a rubber latex comprising only natural rubber latex and also containing a resin-based adhesive that is compatible with the natural rubber latex." In addition, Japanese Patent No. 3210863 describes terpene-phenol resins and terpene-glycols as the resin-based adhesives.

Japanese Unexamined Patent Application Publication No. 2004-035867 describes "a tire puncture sealant containing at least a natural rubber latex, a tackifying resin emulsion, and an antifreezing agent, wherein a solid content (A) of the natural rubber latex is from 30 to 60 parts by weight, a solid content (B) of the tackifying resin emulsion is from 10 to 30 parts by weight and a content (C) of the antifreezing agent is from 20 to 50 parts by weight per 100 parts by weight of a total solid contents that is a sum (A+B+C) of the solid content (A) of the natural rubber latex, the solid content (B) of the tackifying resin emulsion and the content (C) of the anti-freezing agent; an aromatic modified terpene resin is used as a tackifying resin in the tackifying resin emulsion, and the tire puncture sealant can maintain high, stable sealing performance over a long period of time even when stored under harsh temperature conditions for a long period of time."

Japanese Unexamined Patent Application Publication No. 2005-120272 describes "a tire puncture sealant having improved low temperature fluidity while exhibiting excellent puncture sealing performance, containing a natural rubber latex, a tackifying resin emulsion and an antifreezing agent comprising ethylene glycol or propylene glycol, wherein a liquid phase portion other than a solid phase portion comprising a solid content of the rubber latex and a solid content of the tackifying resin emulsion contains the glycol, water and a monohydric alcohol."

Japanese Unexamined Patent Application Publication No. 2007-224246 describes "a tire puncture sealant that contains an antifreezing agent, a tackifier and at least one type of synthetic resin emulsion selected from the group consisting of urethane emulsions, acrylic emulsions, polyolefin-based emulsions, ethylene-vinyl acetate-based emulsions, vinyl acetate-based emulsions and poly(vinyl chloride)-based emulsions, has a hydrogen ion exponent of from 5.5 to 8.5, has similar sealing performance to conventional tire puncture sealants, has excellent storage stability at relatively low viscosities, produces scarcely any irritating odor, and corrodes steel cords very little."

Japanese Unexamined Patent Application Publication No. 2007-224248 describes "a tire puncture sealant that contains an acrylic emulsion, an antifreezing agent, and a tackifier, has similar sealing performance to conventional tire puncture sealants, and has excellent storage stability at relatively low viscosities."

The inventors of the present invention investigated the puncture sealant disclosed in Japanese Patent No. 3210863 by carrying out a vibration test and measuring a viscosity of this puncture sealant in order to evaluate storage performance, and learned that the viscosity had increased, thus causing sealing performance and storage performance to deteriorate.

The puncture repair kits that contain the puncture sealant as a constituent are stored inside a vehicle or inside the trunk of the vehicle in actual usage conditions and therefore move with the automobile. Therefore, the puncture repair kits are subjected to repeated vibration when the vehicle moves and are exposed to extremely high temperatures inside the vehicle or inside the trunk on hot sunny days.

By taking into account such actual storage conditions, there is a high probability that the puncture sealant described in Japanese Patent No. 3210863 will not exhibit satisfactory sealing performance after being stored in a vehicle for a long period of time.

As a result, an object of the present invention is to provide a tire puncture sealant having both excellent sealing performance and excellent storage performance.

SUMMARY

As a result of diligent research into the causes of deterioration of storage performance, the inventors of the present invention came to the conclusion that tackifiers and resin-based adhesives (for example, terpene-phenol resins and terpene-glycols) that are contained as essential components in conventional tire puncture sealants such as that described in Japanese Patent No. 3210863 are closely linked to the deterioration in sealing performance and storage performance of such conventional tire puncture sealants under conditions such as high temperatures or vibration.

As a result of further diligent research into how to obtain a tire puncture sealant having excellent sealing performance and storage performance without containing a tackifier as an essential component, the inventors of the present invention discovered that a tire puncture sealant containing a natural rubber latex (A) and a copolymer resin emulsion of an ester of versatic acid and vinyl alcohol (B) (hereinafter called "VEOVA"), in which a ratio (A)/(B) of a solid content mass of the natural rubber latex (A) to a solid content mass of the VEOVA copolymer resin emulsion (B) falls within a specified range, exhibits excellent sealing performance and storage performance, thereby arriving at the present invention.

Furthermore, the inventors of the present invention discovered that by using a non-ionic surfactant in combination with an anionic surfactant, it is possible to further improve sealing performance and storage performance, thereby increasing the benefits of the present invention.

The inventors of the present invention also discovered during the process of arriving at the present invention that it is possible to greatly reduce an amount of gel produced in the natural rubber latex by suppressing an increase in a temperature of a mixed system to 10° C. or less when adding an antifreezing agent (especially a glycol-based compound) to a mixed system containing the natural rubber latex in order to produce the tire puncture sealant.

Specifically, the following inventions are provided.

(1) A tire puncture sealant including a natural rubber latex (A) and a copolymer resin emulsion of an ester of versatic acid and vinyl alcohol (hereinafter called "VEOVA") (B), wherein a ratio of a solid content mass of the natural rubber latex (A)/a solid content mass of the VEOVA copolymer resin emulsion (B) is in a range from 80/20 to 15/85.

(2) The tire puncture sealant according (1), wherein a total solid content of the natural rubber latex (A) and the VEOVA copolymer resin emulsion (B) is from 20.0 to 40.0 mass % of a total mass of the tire puncture sealant.

(3) The tire puncture sealant according to (1) or (2), wherein the VEOVA copolymer resin emulsion (B) is an ethylene-vinyl acetate-VEOVA copolymer resin emulsion.

(4) The tire puncture sealant according to any one of (1) to (3), further including a surfactant, wherein a content of the surfactant is from 1.0 to 6.0 mass % of the solid content mass of the natural rubber latex (A).

(5) The tire puncture sealant according to (4), wherein the surfactant includes a non-ionic surfactant and an anionic surfactant, and a ratio of an included mass of the non-ionic surfactant/an included mass content of the anionic surfactant is in a range from 1.0/1.0 to 1.0/5.0.

(6) The tire puncture sealant according to (5), wherein the non-ionic surfactant is a polyoxyethylene alkyl ether and the anionic surfactant is sodium lauryl sulfate.

(7) The tire puncture sealant according to any one of (1) to (6), further including from 80 to 180 parts by mass of an antifreezing agent per 100 parts by mass of a total solid content of the natural rubber latex (A) and the VEOVA copolymer resin emulsion (B).

(8) The tire puncture sealant according to (7), wherein an antifreezing component of the antifreezing agent is selected from the group consisting of propylene glycol, ethylene glycol, di(ethylene glycol) and mixtures thereof.

(9) A manufacturing method for the tire puncture sealant according to (8), wherein the increase in the temperature of the mixed system is kept beneath 10° C. or less when mixing the antifreezing agent with the mixed system including the natural rubber latex and the VEOVA copolymer resin emulsion.

(10) A tire puncture sealant manufactured using the manufacturing method according to (9).

(11) A puncture repair kit including the tire puncture sealant according to any one of (1) to (8).

(12) The puncture repair kit according to (11), further including a compressor.

(13) A vehicle fitted with the puncture repair kit according to (11) or (12).

According to the present invention, it is possible to provide a tire puncture sealant having both excellent sealing performance and excellent storage performance.

DETAILED DESCRIPTION

The present invention is described below in detail.

1. Components

A tire puncture sealant of the present invention contains a natural rubber latex (A) and a VEOVA copolymer resin emulsion (B) as main components. A ratio (A)/(B) of a solid content mass of the natural rubber latex (A)/a solid content mass of the VEOVA copolymer resin emulsion (B) is in a range from 80/20 to 15/85, preferably in a range from 80/20 to 20/80, more preferably in a range from 70/30 to 20/80, and even more preferably in a range from 60/40 to 20/80.

(1) Natural Rubber Latex (A)

The natural rubber latex (A) for use in the tire puncture sealant of the present invention is not particularly limited, and it is possible to use a rubber latex obtained by tapping the Hevea brasiliensis tree.

Natural rubber latex from which proteins have been removed (known as "deproteinized natural rubber latex") is preferred as the natural rubber latex (A). If a protein content of the natural rubber latex is low, it is possible to reduce an amount of ammonia produced, which is desirable from the perspectives of preventing corrosion damage of steel cords by ammonia and preventing the generation of irritating odors.

Specific examples of the natural rubber latex that can be used include Deproteinized Natural Rubber Latex (SeLatex series, manufactured by SRI Hybrid Ltd.), Deproteinized Natural Rubber Latex (Hytex HA, manufactured by Fulflex and available from Nomura Trading Co., Ltd.), Ultra-low Ammonia Natural Rubber Latex (ULACOL, manufactured by Regitex Co., Ltd.), and the like.

(2) VEOVA Copolymer Resin Emulsion (B)

The VEOVA copolymer resin emulsion (B) used in the tire puncture sealant of the present invention is not particularly limited so long as it is an emulsion of a copolymer resin that contains VEOVA (an ester of versatic acid and vinyl alcohol) as a monomer unit.

Examples of the VEOVA copolymer resin emulsion include a ethylene-vinyl acetate-VEOVA copolymer resin emulsion, a vinyl acetate-VEOVA copolymer resin emulsion, a vinyl acetate-VEOVA-acrylic copolymer resin emulsion, a vinyl acetate-VEOVA-acrylic-ethylene copolymer resin emulsion, and the like.

Of these, the ethylene-vinyl acetate-VEOVA copolymer resin emulsion is preferred. In addition, a glass transition point (Tg) of the ethylene-vinyl acetate-VEOVA copolymer resin emulsion is not particularly limited, but is preferably approximately −20° C. or lower, more preferably approximately −25° C. or lower, and even more preferably approximately −30° C. or lower.

Specific examples of the ethylene-vinyl acetate-VEOVA copolymer resin emulsion include Sumikaflex 950HQ (manufactured by Sumitomo Chemtex, solid content=approximately 53 mass %; Tg=−30° C.) and Sumikaflex 951HQ (manufactured by Sumitomo Chemtex, solid content=approximately 55 mass %; Tg=−25° C.)

Solid Content

The ratio (A)/(B) of the solid content mass of the natural rubber latex (A) to the solid content mass of the VEOVA copolymer resin emulsion (B) is not particularly limited as long as it is in the range from 80/20 to 15/85, but is preferably in a range from 80/20 to 20/80, more preferably in a range from 70/30 to 20/80, and even more preferably in a range from 60/40 to 20/80. If the ratio (A)/(B) falls within this range, sealing performance and storage performance will be excellent.

A total solid content of the natural rubber latex (A) and the VEOVA copolymer resin emulsion (B) relative to the tire puncture sealant of the present invention is not particularly limited, but is preferably in a range from 20.0 to 40.0 mass %, and more preferably in a range from 20.0 to 35.0 mass %. If the total solid content falls within this range, sealing performance is excellent not only in center groove portions, but also in shoulder groove portions.

(3) Surfactant

The tire puncture sealant of the present invention can contain a surfactant if required. The surfactant can be a non-ionic, an anionic or cationic surfactant or a combination of two or more types of the non-ionic, the anionic or the cationic surfactants. The combination of the surfactants is not particularly limited, but a combination of the non-ionic and the anionic surfactants is preferable from the perspective of improving sealing performance and storage performance.

When using a combination of the non-ionic and the anionic surfactants, a compounding ratio thereof (compounded amount (parts by mass) of the non-ionic surfactant/compounded amount (parts by mass) of the anionic surfactant, expressed so that the compounded amount of the non-ionic surfactant is 1.0) is not particularly limited, but is preferably in a range from 1.0/1.0 to 1.0/5.0, more preferably in a range from 1.0/1.0 to 1.0/3.0, and even more preferably in a range from 1.0/1.0 to 1.0/2.0. If the compounding ratio falls within this range, the sealing performance and storage performance are improved in a well-balanced manner.

If the surfactant is included in the tire puncture sealant, a content thereof is not particularly limited, but is preferably in a range from 1.0 to 6.0 mass % of the solid content of the natural rubber latex (A).

Examples of the non-ionic surfactant include polyoxyethylene alkyl ether, polyoxyethylene alkyl phenyl ether, polyoxyethylene alkylamine, polyoxyethylene alkylamide, polyoxyethylene fatty acid ester, polyoxyethylene castor oil, polyoxyethylene fatty acid diester, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, and the like non-ionic surfactants. An HLB of the non-ionic surfactant is not particularly limited, but is preferably in a range from 12.0 to 19.0.

Examples of the polyoxyethylene alkyl ether include polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, polyoxyethylene isostearyl ether, and the like.

Examples of the polyoxyethylene lauryl ether include EMULGEN 108 (HLB=12.1), EMULGEN 109P (HLB=13.6), EMULGEN 120 (HLB=15.3), EMULGEN 123P (HLB=16.9), EMULGEN 130K (HLB=18.1), EMULGEN 147 (HLB=16.3), EMULGEN 150 (HLB=18.4) (all manufactured by Kao Corporation), and the like.

Examples of the polyoxyethylene oleyl ether include EMULGEN 409P (HLB=12.0), EMULGEN 420 (HLB=13.6), EMULGEN 430 (HLB=16.2) (all manufactured by Kao Corporation), and the like.

Examples of the polyoxyethylene alkyl phenyl ether include polyoxyethylene octylphenyl ether, polyoxyethylene nonylphenyl ether, polyoxyethylene dodecyl phenyl ether, polyoxyethylene styrenated phenyl ether, polyoxyethylene phenyl ether, polyoxyethylene benzyl ether, polyoxyethylene β-naphthyl ether, polyoxyethylene bisphenol A ether, polyoxyethylene bisphenol F ether, and the like.

Examples of the polyoxyethylene distyrenated phenyl ether include EMULGEN A-150 (HLB=18), EMULGEN A-60 (HLB=12.8), and EMULGEN A-90 (HLB=14.5), all manufactured by Kao Corporation.

Examples of the polyoxyethylene alkylamine include polyoxyethylene laurylamine, polyoxyethylene beef tallow amine, polyoxyethylene stearylamine, polyoxyethylene oleylamine, polyoxyethylene beef tallow propylene diamine, polyoxyethylene stearyl propylene diamine, polyoxyethylene N-cyclohexylamine, polyoxyethylene metaxylylene diamine, and the like.

Examples of the polyoxyethylene laurylamine include BLAUNON L-207 (HLB=12.1), L-210 (HLB=13.6), L-220 (HLB=16.2), and L-230 (HLB=17.5) (all manufactured by Aoki Oil Industrial).

Specific examples of the polyoxyethylene stearylamine include AMIET 320 (HLB=15.4) (manufactured by Kao Corporation).

Examples of the anionic surfactant include alkyl sulfates, alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfo fatty acid methyl ester salts (α-MES), α-olefin sulfonates, alkanesulfonates, (mono)alkyl phosphates, polyoxy-mono and di-styryl phenylether monoester sulfosuccinates, alkyl phenoxy polyoxyethylene propyl sulfonates, and the like.

Examples of the cationic surfactant include tetraalkyl ammonium chloride, trialkyl benzyl ammonium chloride, alkylamines, monooxyethylene alkylamines, polyoxyethylene alkylamines, and the like.

(4) Antifreezing Agent

The antifreezing agent that can be used in the tire puncture sealant of the present invention is not particularly limited, and it is possible to use antifreezing agents that contain conventional, publicly known antifreezing components.

Specific examples of the antifreezing agent include antifreezing agents containing, as antifreezing components, one or more types of a glycol-based compound having a melting point of −10° C. or lower at a pressure of 1,013 hPa and being miscible with water, such as ethylene glycol, propylene glycol, di(ethylene glycol), and the like. The antifreezing agent may contain only the antifreezing component or may contain another component such as water. However, the antifreezing agent containing only the antifreezing component is preferred. These antifreezing agents may be used alone or may be used in any combination of two or more types.

In the present invention, the antifreezing agent preferably contains from 70 to 200 parts by mass, more preferably from 80 to 180 parts by mass, and even more preferably 100-170 parts by mass of the antifreezing component per 100 parts by mass of the total solid content of the natural rubber latex (A) and the VEOVA copolymer resin emulsion (B). If the antifreezing component content falls within this range, sealing performance, storage performance and antifreezing performance will all be excellent.

(5) Viscosity Modifier

The tire puncture sealant of the present invention can further contain a viscosity modifier if required. Water can be used as the viscosity modifier. The viscosity modifier is not particularly limited so long as it is clean water, but is preferably deionized water, and more preferably distilled water.

The viscosity modifier is added so as to adjust a viscosity of the tire puncture sealant of the present invention immediately after production to from approximately 25 mPa·s to approximately 150 mPa·s, and preferably to from 25 mPa·s to 110 mPa·s, when measured at 20° C. using a BL type viscometer (No. 1 rotor). Sealing performance deteriorates if the viscosity of the tire puncture sealant is too high.

(6) Tackifier

The tire puncture sealant of the present invention preferably contains no tackifier because the presence of a tackifier can cause the storage performance to deteriorate. However, the use of a tackifier need not be precluded, and the tire puncture sealant of the present invention may contain a tackifier if necessary. Incorporating the tackifier can further improve the sealing performance, especially in the shoulder portions.

The tackifier is not particularly limited, and specific examples include, for example, rosin resins such as rosin esters, polymerized rosin esters, modified rosins, and the like; terpene resins such as terpene phenols, terpene glycols, aromatic terpenes, and the like; hydrogenated terpene resins (terpene resins to which hydrogen has been added); phenolic resins; xylene resins; and the like. The tackifier may be used alone or may be used in any combination of two or more types.

(7) Other Additives

In addition to the components mentioned above, the tire puncture sealant of the present invention can optionally contain additives such as gelling agents, fillers, antiaging agents, antioxidants, pigments, plasticizers, thixotropic agents, UV absorbents, flame retardants, surfactants other than those mentioned above (including leveling agents), dispersants, dehydrating agents and antistatic agents.

Specific examples of the gelling agent include alginic acid derivatives, cellulose derivatives, and the like. These gelling agents may be used alone or may be used in any combination of two or more types. Incorporating such a gelling agent further improves the shoulder groove portion sealing performance of the tire puncture sealant of the present invention. It is thought that the sealing performance is improved because the gelling agent absorbs the water and the antifreezing agent, slightly destabilizes the particles and allows for easier coagulation at a time of sealing.

The filler can be an organic or inorganic filler of any form. Specific examples of the filler include fumed silica, calcined silica, precipitated silica, and molten silica; diatomaceous earth; iron oxide, zinc oxide, titanium oxide, barium oxide, and magnesium oxide; calcium carbonate, magnesium carbonate, and zinc carbonate; pyropyllite clay, kaolin clay, and calcined clay; carbon black; fatty acid-treated products, resin acid-treated products, urethane compound-treated products and fatty acid ester-treated products thereof; and the like.

Specific examples of the antiaging agent include compounds such as a hindered phenol compound and the like.

Specific examples of the antioxidant include butylhydroxytoluene (BHT), butylhydroxyanisole (BHA), and the like.

Specific examples of the pigment include inorganic pigments such as titanium oxide, zinc oxide, ultramarine, iron red, lithopone, lead, cadmium, iron, cobalt, aluminum, hydrochlorides, sulfates, and the like; organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, carbon black, and the like; and the like.

Specific examples of the plasticizer include diisononyl phthalate (DINP); dioctyl adipate and indecyl succinate; di(ethyleneglycol)dibenzoate and pentaerythritol esters; butyl oleate and methyl acetyl ricinoleate; tricresyl phosphate and trioctyl phosphate, propylene glycol adipate polyesters and butylene glycol adipate polyesters; and the like.

Specific examples of the thixotropic agent include Aerosil (manufactured by Nippon Aerosil), Disparlon (manufactured by Kusumoto Chemicals, Ltd.), and the like.

Specific examples of the flame retardant include chloroalkyl phosphates, dimethyl phosphates, methyl phosphates, bromine or phosphorus compounds, ammonium polyphosphates, neopentyl bromide polyethers, brominated polyethers, and the like.

Specific examples of the antistatic agent include hydrophilic compounds such as quaternary ammonium salts; polyglycols, ethylene oxide derivatives, and the like; and the like.

2. Manufacturing Method

The manufacturing method of the tire puncture sealant of the present invention is not particularly limited, but can be, for example, a method in which the natural rubber latex, the VEOVA copolymer resin emulsion, and, if required, the surfactant, the antifreezing agent, and a variety of additives are placed in a reaction vessel and then sufficiently kneaded under reduced pressure using a blending machine such as a mixer, or the like.

When manufacturing the tire puncture sealant of the present invention, it is preferable to suppress an increase in a temperature of a mixed system to 10° C. or less when adding the antifreezing agent (especially when adding the glycol-based compound) to a mixed system that contains the natural rubber latex. By suppressing the increase in the temperature to 10° C. or less, it is possible to suppress an amount of gel produced in the natural rubber latex to less than 2 mass %, preferably less than 1 mass %, and more preferably less than 0.5 mass %. However, if the increase in the temperature exceeds 10° C., the amount of gel produced in the natural rubber latex will increase dramatically, and may reach 3 mass % or higher. It goes without saying that the smaller the amount of gel that is produced, the better.

A method for suppressing the increase in the temperature is not particularly limited, but can involve, for example, cooling the mixed system or the antifreezing agent (especially the glycol-based compound) in advance; using a temperature-regulating function of a blending machine; or controlling a rate at which the antifreezing agent (especially the glycol-based compound) is added. These methods may be used alone or may be used in any combination of two or more.

It is thought that if the temperature of the natural rubber latex increases dramatically, gel will be produced due to dispersion instability and coagulation. Therefore, suppressing the increase in the temperature to 10° C. or less when adding the glycol-based compound to the mixed system containing the natural rubber latex is not limited to the tire puncture sealant of the present invention, and can be applied to, for example, the tire puncture sealants disclosed in Patent Documents 1 to 3, which also contain a natural rubber latex. This will lead to a reduction of the amount of gel produced in the natural rubber latex.

3. Method of Use

Next, a method of using the tire puncture sealant of the present invention will be explained. However, the method of using the tire puncture sealant of the present invention is not limited to the following method.

First, the tire puncture sealant of the present invention is injected into a tire via the air-filling part of the tire. The method for injecting the tire puncture sealant of the present invention into the tire is not particularly limited, and it is possible to use a conventional, publicly known method, for example a method involving use of a syringe or a spray. The amount of the tire puncture sealant injected into the tire is not particularly limited and is selected as appropriate according to, for example, a size of a puncture hole.

Next, the tire is filled with air until a predetermined air pressure is reached.

The vehicle is then driven. Aggregates of natural rubber particles and the like are formed by compressive forces and shear forces exerted when the tire rotates and comes into contact with the ground, thereby enabling sealing of the puncture hole.

4. Sealing performance: Definitions of Terms and Test/Evaluation Methods

"Sealing performance" refers to performance when sealing a hole in the center groove portion of a tire (hereinafter simply called "center groove portion sealing performance) and/or performance when sealing a hole in the shoulder groove portion of a tire (hereinafter simply called "shoulder groove portion sealing performance), and is evaluated according to the following test methods.

"Excellent sealing performance" refers to excellent sealing performance in the center groove portion and/or the shoulder groove portions.

An example of sealing performance test/evaluation methods is as follows.

Evaluation Method for Sealing Performance

Sealing performance is evaluated as "excellent" if the center groove portion sealing performance is "○" and shoulder groove portion sealing performance is "⊙", "○" or "x".

Test/Evaluation Method for Center Groove Portion Sealing Performance

A puncture hole (4 mm in diameter) is made in the center groove portion of a tread of a tire.

Next, the punctured tire is mounted on a drum tester, the tire puncture sealant is injected via a tire valve and the tire is then filled with air until the pressure inside the tire reaches 250 kPa.

The tire is then driven for eight minutes at a speed of 30 km/h under a load of 350 kg, after which a presence or absence of air seepage is confirmed both visually and by spraying soapy water in the vicinity of the puncture hole.

If there is no air seepage, the center groove portion sealing performance is evaluated as "excellent" ("○"), and if there is air seepage, the center groove portion sealing performance is evaluated as poor ("x")

Test/Evaluation Method for Shoulder Groove Portion Sealing Performance

A puncture hole (4 mm in diameter) is made in the shoulder groove portion of the tread of a tire.

Next, the punctured tire is mounted on a drum tester, the tire puncture sealant is injected via the tire valve and the tire is then filled with air until the pressure inside the tire reaches 200 kPa.

The tire is then subjected to intermittent driving, in which the tire is repeatedly driven for one minute at a speed of 30 km/h under a load of 350 kg and then stopped, until there is no air seepage observed when evaluated as described above.

When evaluating the results of this procedure, the shoulder groove portion sealing performance is evaluated as "extremely excellent" ("⊙") if air seepage ceases after carrying out the intermittent running from 1 to 10 times, "excellent" ("○") if air seepage ceases after carrying out the intermittent running from 11 to 15 times, and "poor" ("x") if air seepage has not ceased after carrying out the intermittent running 16 or more times.

5. Storage Performance—Definitions of Terms and Test/Evaluation Methods

"Storage performance" refers to storage stability and viscosity stability, and is evaluated according to the following test/evaluation methods.

"Excellent storage performance" refers to excellent storage stability and viscosity stability in a vibration test.

An example of an evaluation method for storage performance is as follows.

Evaluation Method for Storage Performance

If storage stability and viscosity stability are both evaluated as "○", storage performance is evaluated to be excellent.

Testing and Evaluation Methods for Storage Stability

A condition of the tire puncture sealant is observed immediately after the vibration test.

A state of dispersion is observed visually, and if there is no precipitation/separation, storage stability is evaluated as "○", and if there are aggregates or films, storage stability is evaluated as "x".

Testing and Evaluation Methods for Viscosity Stability

Immediately before and immediately after the vibration test, a pre-vibration viscosity and a post-vibration viscosity are measured at 20° C. using a BL type viscometer (No. 2 rotor, 60 rpm).

The viscosity stability is evaluated as "excellent" ("○") if the post-vibration viscosity is less than 50% higher than the pre-vibration viscosity and as "poor" ("x") if the post-vibration viscosity is 50% or higher than the pre-vibration viscosity.

Vibration Test Method

The tire puncture sealant is placed in a container. Following nitrogen substitution, the container is sealed and then subjected to vibrations of a frequency of 20 Hz and an amplitude of ±3 mm for seven days at a temperature of 80° C.

EXAMPLES

The present invention will now be described in greater detail using the following examples, but is in no way restricted to these examples.

1. Manufacturing the Tire Puncture Sealant (1) Components

Figure 1A:
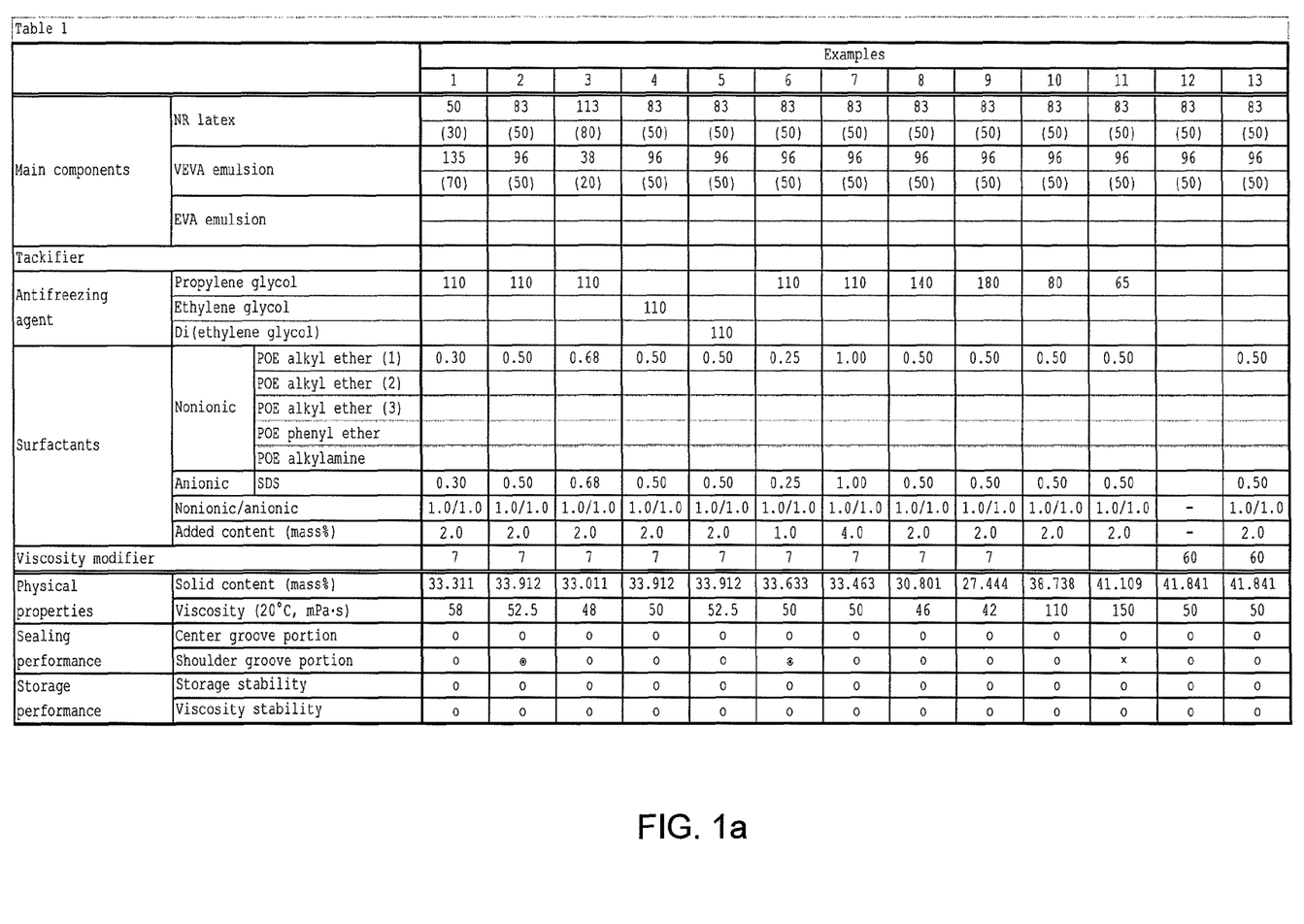
FIGS. 1a-1b includes Table 1 referenced herein.
Figure 1B:
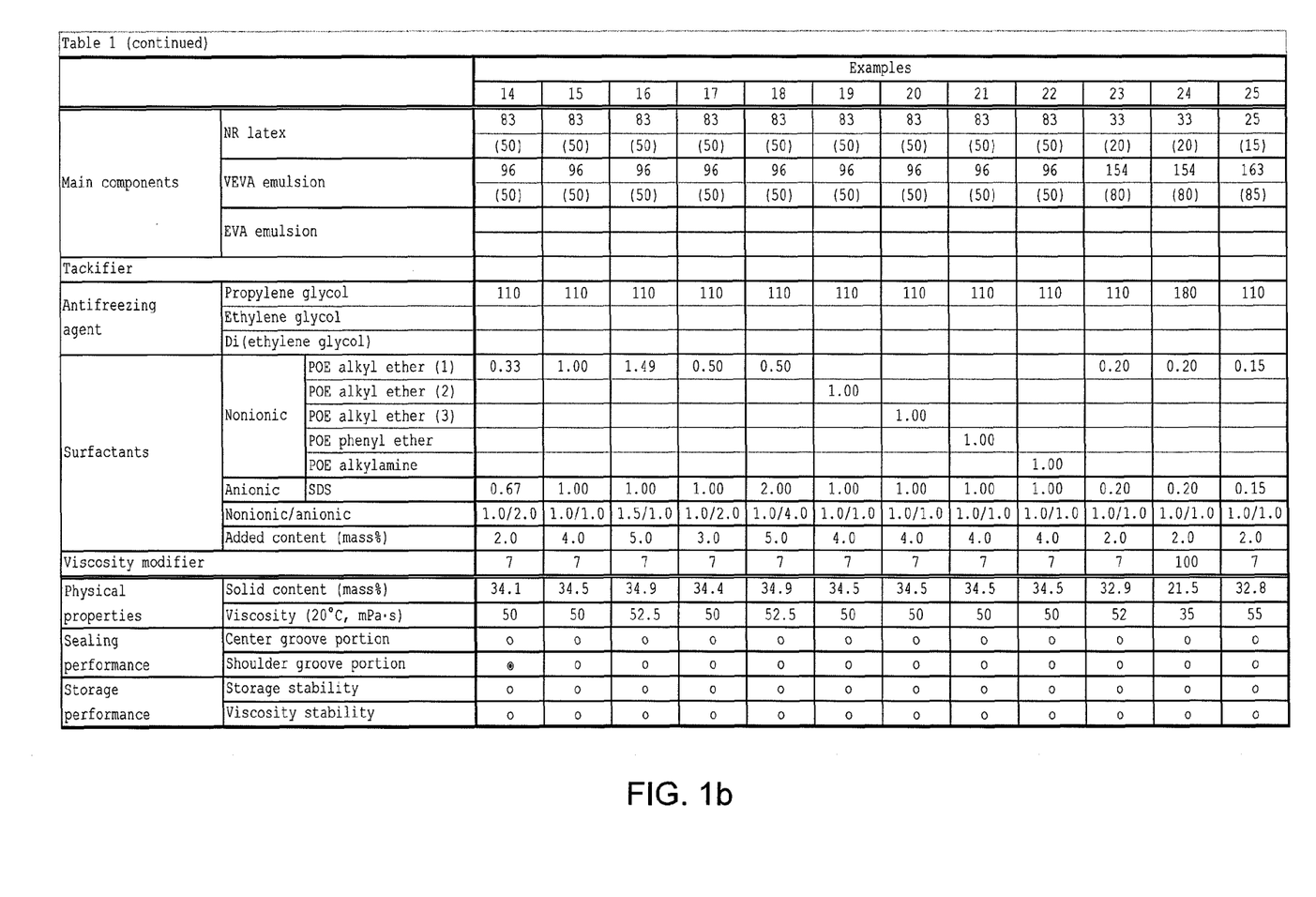
Figure 2:
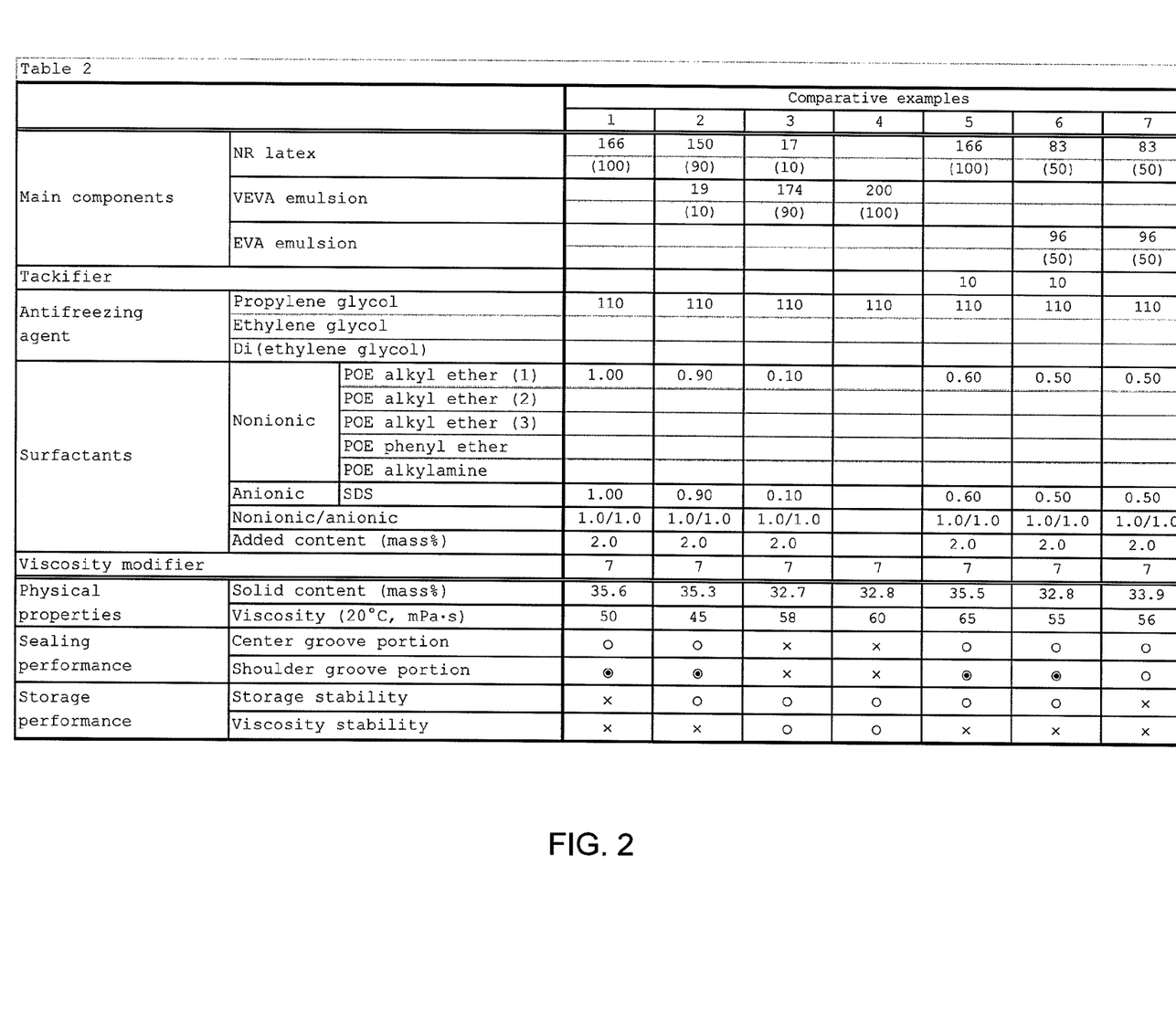
FIG. 2 includes Table 2 referenced herein.

Details of the components indicated in Table 1 (Examples 1 to 25) and Table 2 (Comparative examples 1 to 7) are as follows.

Main Components

NR latex: Natural rubber latex (Hytex HA, manufactured by Fulflex and available from Nomura Trading Co., Ltd.; Solid content=60 mass %)

VEVA emulsion: Ethylene-vinyl acetate-VEOVA copolymer resin emulsion (Product name: Sumikaflex 950HQ, manufactured by Sumitomo Chemtex; Solid content=approximately 53 mass %)

EVA emulsion: Ethylene-vinyl acetate copolymer resin emulsion (product name: Sumikaflex 408HQE, manufactured by Sumitomo Chemtex; Solid content=approximately 50 mass %)

Tackifier

Terpene phenol resin emulsion (product name: R1050, manufactured by Yasuhara Chemical Co., Ltd.)

Antifreezing Agents

Propylene glycol (manufactured by Sankyo Chemical Industry Co., Ltd.)

Ethylene glycol (manufactured by Sankyo Chemical Industry Co., Ltd.)

Di(ethylene glycol) (manufactured by Sankyo Chemical Industry Co., Ltd.)

Viscosity Modifier
  Water (deionized water)
Surfactants
  POE alkyl ether (1): Polyoxyethylene oleyl ether (product name: Emulgen 430, manufactured by Kao Corporation; HLB=16.2)
  POE alkyl ether (2): Polyoxyethylene lauryl ether (product name: Emulgen 123P, manufactured by Kao Corporation; HLB=16.9)
  POE alkyl ether (3): Polyoxyethylene lauryl ether (product name: Emulgen 108, manufactured by Kao Corporation; HLB=12.1)
  POE phenyl ether: Polyoxyethylene distyrenated phenyl ether (product name: Emulgen A-90, manufactured by Kao Corporation; HLB=14.5)
  POE alkylamine: Polyoxyethylene alkylamine (product name: Amiet 320, manufactured by Kao Corporation; HLB=15.4)
  SDS: Sodium lauryl sulfate (product name: Emal 10PT, manufactured by Kao Corporation)
(2) Manufacturing Method Examples 1 to 25 and Comparative Examples 1 to 7

The components listed in Table 1 (Examples 1 to 25) and Table 2 (Comparative examples 1 to 7) were blended in a mixer according to the compositions indicated in Table 1 so as to obtain the tire puncture sealants indicated in Table 1 (Examples 1 to 25) and Table 2 (Comparative examples 1 to 7).

Figure 3:
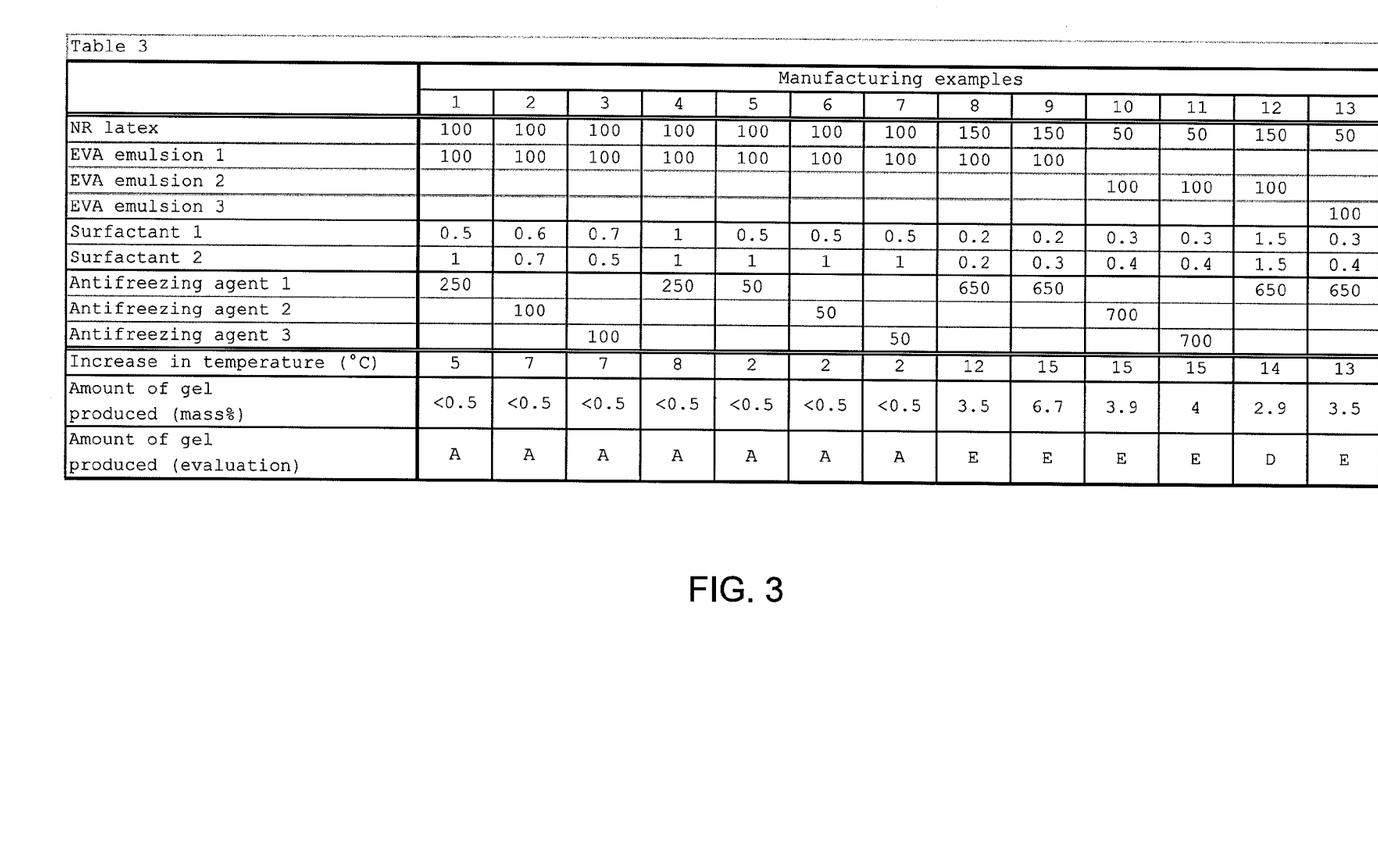
FIG. 3 includes Table 3 referenced herein.

Moreover, the numerical values of the components listed in Table 1 and Table 2 have the following meanings.
Main Components
  Upper numerical values indicate the compounded amounts of the latex or emulsion as values per 100 parts by mass of the total solid content of the main components (units: parts by mass).
  Lower numerical values indicate the compounded amounts of the latex or emulsion in terms of solid content per 100 parts by mass of the total solid content of the main components (units: parts by mass).
Tackifier, Antifreezing Agent, and Viscosity Modifier
  These values indicate the content (units: parts by mass) per 100 parts by mass of the total solid content of the main components.
Surfactants
  These values indicate the content (units: parts by mass) per 100 parts by mass of the total solid content of the main components.
  "Added content (mass %)" means the total content (units: mass %) of all the added surfactants relative to the mass of the solid content of the natural rubber latex.
Solid Content
  The "solid content (mass %)" means the total solid content (units: mass %) of the main components relative to the overall mass of the tire puncture sealant.
2. Evaluation of Sealing Performance
  The tire puncture sealants produced according to the method described above were tested and evaluated in terms of sealing performance (center groove portion sealing performance and shoulder groove portion sealing performance) in accordance with the methods described above.
  The results are shown in the "Sealing performance" rows of Table 1 (Examples 1 to 25) in FIGS. 1a-1b and Table 2 (Comparative examples 1 to 7) in FIG. 2.
3. Evaluation of Storage Performance
  The tire puncture sealants produced according to the method described above were tested and evaluated in terms of storage performance (storage stability and viscosity stability) in accordance with the methods described above. The results are shown in the "Storage performance" rows of Table 1 (Examples 1 to 25) in FIGS. 1a-1b and Table 2 (Comparative examples 1 to 7) in FIG. 2.
4. Overall Evaluation
  As is clear from the results indicated in Table 1 (Examples 1 to 25), the tire puncture sealants that contained the natural rubber latex (A) and the VEVA copolymer resin emulsion (B) in such quantities that the solid content mass of the natural rubber latex (A)/the solid content mass of the VEVA copolymer resin emulsion (B) was in the range from 80/20 to 15/85 exhibited excellent sealing performance and storage performance.
  As is clear from the results in Table 2 (Comparative examples 1 to 7), however, the tire puncture sealants that contained the natural rubber latex (A) and the VEVA copolymer resin emulsion (B) in such quantities that the solid content mass of the natural rubber latex (A)/the solid content mass of the VEVA copolymer resin emulsion (B) was not in the range from 80/20 to 15/85 exhibited poor sealing performance or poor storage performance.
  Therefore, it is clear that the tire puncture sealant of the present invention exhibits not only excellent sealing performance, but also excellent storage performance.
  That is, the tire puncture sealant of the present invention exhibits excellent sealing performance even after being kept in a vehicle for a long period of time.
5. Manufacturing Examples (Relationship Between Increase in Temperature and Amount of NR Gel Produced)
(1) Components and Composition of Tire Puncture Sealant Samples
  Table 3 in FIG. 3 shows the components and compositions of the tire puncture sealant samples used in the manufacturing examples. The numerical values indicate values per 100 parts by mass of the solid content of the EVA emulsion (units: parts by mass).
  The components are as follows.
    NR latex: Natural rubber latex (Hytex HA, manufactured by Fulflex and available from Nomura Trading Co., Ltd.; Solid content=60 mass %)
    EVA emulsion 1: Ethylene-vinyl acetate-vinyl ester of versatic acid copolymer resin emulsion (product name: Sumikaflex 950HQ, manufactured by Sumitomo Chemtex; Solid content=approximately 53 mass %)
  Note that "Vinyl ester of versatic acid" is referred to as "VEVA".
    EVA emulsion 2: Ethylene-vinyl acetate copolymer resin emulsion (product name: Sumikaflex 408HQE, manufactured by Sumitomo Chemtex; Solid content=approximately 50 mass %)
    EVA emulsion 3: Ethylene-vinyl acetate copolymer resin emulsion (product name: Sumikaflex 400HQ, manufactured by Sumitomo Chemtex; Solid content=approximately 55 mass %)
    Surfactant 1: Polyoxyethylene oleyl ether (product name: Emulgen 430, manufactured by Kao Corporation; HLB=16.2)
    Surfactant 2: Sodium lauryl sulfate (product name: Emal 10PT, manufactured by Kao Corporation; anionic surfactant)
    Antifreezing agent 1: Propylene glycol
    Antifreezing agent 2: Di(ethylene glycol)
    Antifreezing agent 3: Glycerin (2) Method
(2.1) Manufacturing the Tire Puncture Sealant Using a blending machine, the components shown in Table 3 (Manufacturing examples 1 to 13) were blended in an order of the NR latex, the surfactant, and the EVA emulsion so as to obtain mixed systems containing the NR latex.

Next, the antifreezing agents were added to the mixed systems. In Manufacturing examples 1 to 7, temperatures of the mixed systems were controlled so that the increase in the temperature of the mixed systems was 10° C. or less when the antifreezing agent was added, but no particular temperature control was carried out in Manufacturing examples 8 to 13.

The tire puncture sealants of Manufacturing examples 1 to 13 were manufactured according to the above-described method.

(2.2) Measuring the Amount of Gel Produced

Following manufacture, the tire puncture sealants were filtered, gel was filtered off and dried, and solid content mass of the gel was measured.

The solid content mass of the gel was divided by the solid content mass of the compounded NR latex to calculate the amount of NR gel produced in terms of mass %.

Table 3 shows the increase in the temperature when the antifreezing agent was added to the tire puncture sealant and the amount of NR gel produced. Moreover, indications that the amount of NR gel produced of was "<0.5" in Manufacturing examples 1 to 7 means that the amount of gel produced was less than 0.5 mass %.

An amount of gel produced of less than 0.5 mass % was evaluated as "A", 0.5 or higher and less than 1.0 mass % as "B", 1.0 or higher and less than 2.0 mass % as "C", 2.0 or higher and less than 3.5 mass % as "D" and 3.5 mass % or higher as "E". "A" and "B" evaluations were considered "passing" scores.

(3) Results and Evaluation
(3.1) Results

Figure 4:
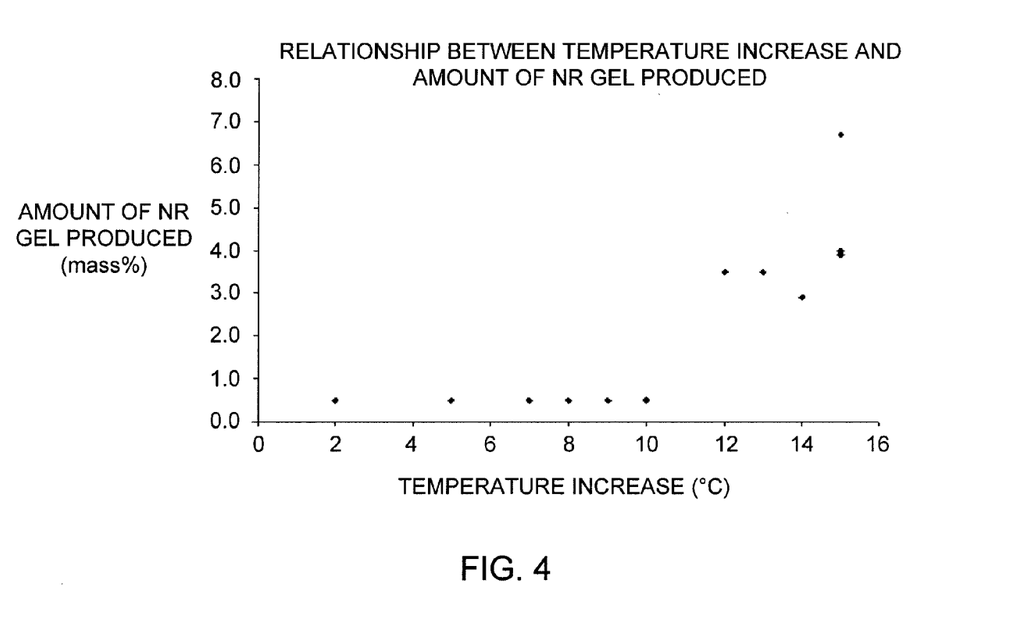
FIG. 4 is an illustration showing a relationship between an increase in a temperature when manufacturing a tire puncture sealant and an amount of a NR gel produced.

The tire puncture sealants of Manufacturing examples 1 to 7, in which the increase in the temperature when adding the antifreezing agent was suppressed to 10° C. or less, were all evaluated as "A" (the amount of gel produced during manufacture was less than 0.5 mass %), and were therefore extremely favorable. However, the tire puncture sealants of Manufacturing examples 8 to 13, in which the increase in the temperature when adding the antifreezing agent was greater than 10° C., were all evaluated as "E" with respect to the amount of gel produced during manufacture, with the exception of Manufacturing example 12, which was evaluated as "D", and were therefore extremely poor. Moreover, it can be understood from FIG. 4 that the amount of gel produced increases dramatically if the increase in the temperature when adding the antifreezing agent is greater than 10° C.

(3.2) Evaluation

From the results of Manufacturing examples 1 to 13, it is clear that it is possible to greatly reduce the amount of gel produced by suppressing the increase in the temperature of the mixed system to 10° C. or less when adding the antifreezing agent in a method for producing a tire puncture sealant that contains a natural rubber latex as a main component.

What is claimed is:

1. A tire puncture sealant comprising:
a natural rubber latex (A) and
a copolymer resin emulsion of an ester of versatic acid and vinyl alcohol (hereinafter called "VEOVA") (B),
wherein the VEOVA copolymer resin emulsion (B) is an ethylene-vinyl acetate-VEOVA copolymer resin emulsion, and
wherein a ratio of a solid content mass of the natural rubber latex (A)/a solid content mass of the VEOVA copolymer resin emulsion (B) is in a range from 80/20 to 15/85.

2. The tire puncture sealant according to claim 1, wherein a total solid content of the natural rubber latex (A) and the VEOVA copolymer resin emulsion (B) is from 20.0 to 40.0 mass% of a total mass of the tire puncture sealant.

3. The tire puncture sealant according to claim 1, further comprising a surfactant, wherein a content of the surfactant is from 1.0 to 6.0 mass% of the solid content mass of the natural rubber latex (A).

4. The tire puncture sealant according to claim 3, wherein the surfactant comprises a non-ionic surfactant and an anionic surfactant, and a ratio of a comprised mass of the non-ionic surfactant/a comprised mass content of the anionic surfactant is in a range from 1.0/1.0 to 1.0/5.0.

5. The tire puncture sealant according to claim 4, wherein the non-ionic surfactant is a polyoxyethylene alkyl ether and the anionic surfactant is sodium lauryl sulfate.

6. The tire puncture sealant according to claim 1, further comprising from 80 to 180 parts by mass of an antifreezing agent per 100 parts by mass of a total solid content of the natural rubber latex (A) and the VEOVA copolymer resin emulsion (B).

7. The tire puncture sealant according to claim 6, wherein an antifreezing component of the antifreezing agent is selected from the group consisting of propylene glycol, ethylene glycol, di(ethylene glycol) and mixtures thereof.

8. The tire puncture sealant according to claim 2, further comprising a surfactant, wherein a content of the surfactant is from 1.0 to 6.0 mass % of the solid content mass of the natural rubber latex (A).

9. The tire puncture sealant according to claim 2, further comprising from 80 to 180 parts by mass of an antifreezing agent per 100 parts by mass of a total solid content of the natural rubber latex (A) and the VEOVA copolymer resin emulsion (B).

10. The tire puncture sealant according to claim 1, further comprising from 80 to 180 parts by mass of an antifreezing agent per 100 parts by mass of a total solid content of the natural rubber latex (A) and the VEOVA copolymer resin emulsion (B).

11. The tire puncture sealant according to claim 3, further comprising from 80 to 180 parts by mass of an antifreezing agent per 100 parts by mass of a total solid content of the natural rubber latex (A) and the VEOVA copolymer resin emulsion (B).

12. The tire puncture sealant according to claim 4, further comprising from 80 to 180 parts by mass of an antifreezing agent per 100 parts by mass of a total solid content of the natural rubber latex (A) and the VEOVA copolymer resin emulsion (B).

13. The tire puncture sealant according to claim 5, further comprising from 80 to 180 parts by mass of an antifreezing agent per 100 parts by mass of a total solid content of the natural rubber latex (A) and the VEOVA copolymer resin emulsion (B).

14. The tire puncture sealant according to claim 1, further comprising an amount of gel produced in the natural rubber latex of less than 2 mass %.

15. The tire puncture sealant according to claim 1, further comprising an amount of gel produced in the natural rubber latex of less than 1 mass %.

16. The tire puncture sealant according to claim 1, further comprising an amount of gel produced in the natural rubber latex of less than .5 mass %.

17. The tire puncture sealant according to claim 3, wherein the surfactant comprises a non-ionic surfactant and an anionic surfactant, and a ratio of a comprised mass of the non-ionic surfactant/a comprised mass content of the anionic surfactant is in a range from 1.0/1.0 to 1.0/3.0.

18. A tire puncture sealant comprising:
   a natural rubber latex (A),
   an amount of gel produced in the natural rubber latex of less than 2 mass %, and
   a copolymer resin emulsion of an ester of versatic acid and vinyl alcohol (hereinafter called "VEOVA") (B),
   wherein a ratio of a solid content mass of the natural rubber latex (A)/a solid content mass of the VEOVA copolymer resin emulsion (B) is in a range from 80/20 to 15/85.

19. The tire puncture sealant according to claim 18, wherein the VEOVA copolymer resin emulsion (B) is an ethylene-vinyl acetate-VEOVA copolymer resin emulsion.

20. The tire puncture sealant according to claim 18, wherein the amount of gel produced in the natural rubber latex is less .5 mass %.

\* \* \* \* \*